(12) United States Patent
Metwalley et al.

(10) Patent No.: US 11,308,502 B2
(45) Date of Patent: Apr. 19, 2022

(54) METHOD FOR DETECTING WEB TRACKING SERVICES

(71) Applicant: POLITECNICO DI TORINO, Turin (IT)

(72) Inventors: Hassan Esam Hassan Metwalley, Airasca (IT); Stefano Traverso, Fossano (IT); Marco Mellia, Turin (IT)

(73) Assignee: Politecnico Di Torino, Turin (IT)

( * ) Notice: Subject to any disclaimer, the term of this patent is extended or adjusted under 35 U.S.C. 154(b) by 148 days.

(21) Appl. No.: 15/771,003

(22) PCT Filed: Dec. 1, 2016

(86) PCT No.: PCT/IB2016/057246
§ 371 (c)(1),
(2) Date: Apr. 25, 2018

(87) PCT Pub. No.: WO2017/093924
PCT Pub. Date: Jun. 8, 2017

(65) Prior Publication Data
US 2018/0332126 A1    Nov. 15, 2018

(30) Foreign Application Priority Data
Dec. 2, 2015   (IT) .................. 102015000079272

(51) Int. Cl.
*G06F 15/173* (2006.01)
*G06Q 30/02* (2012.01)
(Continued)

(52) U.S. Cl.
CPC ......... *G06Q 30/02* (2013.01); *G06Q 30/0619* (2013.01); *H04L 63/1425* (2013.01); *H04L 67/22* (2013.01)

(58) Field of Classification Search
CPC ..... G06Q 30/02; H04L 67/22; H04L 63/1425; H04L 67/02; H04L 67/34; H04L 67/1095;
(Continued)

(56) References Cited

U.S. PATENT DOCUMENTS 8,856,869 B1 * 10/2014 Brinskelle ............... G06F 21/31
726/2
9,219,787 B1 * 12/2015 Manion .................. H04L 67/02
(Continued)

FOREIGN PATENT DOCUMENTS

| CN | 101459548 A | 6/2009 |
|---|---|---|
| CN | 102571547 A | 7/2012 |

(Continued)

OTHER PUBLICATIONS

International Search Report and Written Opinion dated Feb. 7, 2017, issued in PCT Application No. PCT/IB2016/057246, filed Dec. 1, 2016.
(Continued)

*Primary Examiner* — Karen C Tang
(74) *Attorney, Agent, or Firm* — Workman Nydegger

(57) ABSTRACT

A method for detecting web tracking services during browsing activity performed by clients having associated client identifiers includes the steps of extracting key-value pairs contained into navigation data, looking for one-to-one correspondence between said client identifiers and the values contained in said keys and selecting the keys for which at least a client-value one-to-one correspondence for at least a predetermined number of clients is observed, the keys identifying the associated services as services performing tracking activities.

19 Claims, 3 Drawing Sheets

(51) Int. Cl.
  *G06Q 30/06* (2012.01)
  *H04L 67/50* (2022.01)
  *H04L 29/06* (2006.01)
  *G06F 15/16* (2006.01)

(58) Field of Classification Search
  CPC . H04L 67/42; H04L 41/0813; H04L 43/0817; G06F 16/221; G06F 16/95
  USPC .......................................................... 709/224
  See application file for complete search history.

(56) References Cited

U.S. PATENT DOCUMENTS

| | | | |
|---|---|---|---|
| 2006/0106793 A1 | 5/2006 | Liang | |
| 2007/0233671 A1 | 10/2007 | Oztekin et al. | |
| 2008/0195462 A1* | 8/2008 | Magdon-Ismail | G06Q 10/04 705/7.33 |
| 2010/0042487 A1* | 2/2010 | Barazani | G06Q 30/02 705/14.13 |
| 2011/0035288 A1* | 2/2011 | Clyne | G06Q 30/02 705/14.71 |
| 2011/0307320 A1* | 12/2011 | Tangney | G06Q 30/02 705/14.41 |
| 2012/0173692 A1* | 7/2012 | Lakes | G06Q 30/0277 709/223 |
| 2014/0025509 A1* | 1/2014 | Reisz | G06Q 30/0275 705/14.71 |
| 2014/0181314 A1* | 6/2014 | Barzilai | H04L 67/2823 709/227 |
| 2014/0229273 A1* | 8/2014 | Garcia-Martinez | G06Q 30/0275 705/14.46 |
| 2014/0282036 A1* | 9/2014 | Shottan | G06F 16/9566 715/738 |
| 2014/0359073 A1* | 12/2014 | Mendoza | H04L 67/146 709/219 |
| 2014/0365586 A1* | 12/2014 | Friborg, Jr. | H04L 51/14 709/206 |
| 2015/0088980 A1* | 3/2015 | Lakes | H04L 67/02 709/203 |
| 2016/0085833 A1* | 3/2016 | Sinha | G06Q 10/00 707/602 |
| 2016/0371507 A1* | 12/2016 | Jakobsson | H04L 43/06 |
| 2016/0371748 A1* | 12/2016 | Lidow | G06Q 30/0275 |
| 2017/0078415 A1* | 3/2017 | Wang | H04L 67/22 |
| 2017/0083941 A1* | 3/2017 | Biswas | G06Q 30/0255 |
| 2017/0091815 A1* | 3/2017 | Brill | G06Q 30/0255 |

FOREIGN PATENT DOCUMENTS

| | | |
|---|---|---|
| RU | 2 463 654 C2 | 6/2008 |
| RU | 2009 147 271 A1 | 6/2011 |

OTHER PUBLICATIONS

Steven Englehardt et al., *Cookies That Give You Away: The Surveillance Implications of Web Tracking*, Proceedings of the 24th International Conference on World Wide Web, WWW '15, May 18, 2015, pp. 289-299, XP055287112.

Franziska Roesner et al., *Detecting and Defending Against Third-Party Tracking on the Web*, 9th Usenix Symposium on Networked Systems Design and Implementation, Apr. 11, 2013, pp. 1-14, XP061014281.

Hung Chang, *Graph Analysis of Tracking Services in the Web with Business Perspectives*, Master Thesis Submitted to the Faculty IV, Electrical Engineering and Computer Science Database Systems and Information Management Group in Partial Fulfillment of the Requirements for the Degree of MA, Jul. 31, 2015, pp. 1-79, XP002756469.

International Preliminary Report on Patentability dated Jun. 5, 2018, issued in PCT Application No. PCT/IB2016/057246, filed Dec. 1, 2016.

Russian Office Action dated Jun. 11, 2020, issued in Russian Application No. 2018120870.

Russian Search Report dated Jun. 11, 2020, issued in Russian Application No. 2018120870.

Tomoyasu Suzuki et al., *Proposal of HTTP Cookie Regeneration Detection Method by Flash Cookie*, IPSJ Research Report [DVD-ROM], IPSJ, Apr. 15, 2011, vol. 2011-CSEC-52, No. 37, pp. 1-7.

Japanese Office Action dated Nov. 4, 2020, issued in Japanese Application No. 458906.

* cited by examiner (a)

(b)

METHOD FOR DETECTING WEB TRACKING SERVICES

BACKGROUND OF THE INVENTION

1. The Field of the Invention

The present invention relates to a method for detecting web tracking services, in particular for detecting first and third-party tracking services.

2. The Relevant Technology

Tracking services business is based on the collection of information regarding users. When browsing, users are consistently tracked by parties whose business builds on the value of collected data. A tracking service is usually a satellite service linked to a web portal. When a user visits the portal, the tracking service persuades the user's browser to download an artificial information, for example a pixel of the page or an advertising banner.

When the user generates an HTTP request towards the tracking service, this latter records the visit in its own database, sometimes together with all the information reachable at HTTP level (for example, the IP address linked to the user's device, the device and client type, etc.) and at system level (for example, the CPU load, the quantity of memory used, etc.).

The last years witnessed the silent growth of these web tracking services: collecting information about users' online activity is one of the most profitable activity in the Internet. There are hundreds of companies which base their whole business on it. A countless number of web tracking technologies are in use and tens of business models have been developed around web tracking. This phenomenon is ubiquitous, with both major and mostly unknown players taking part in it.

Due to the fact that tracking services are usually linked to many portals, the same user can be monitored and tracked by various sites.

Once collected, the tracking service uses the data for commercial purposes, for example for creating user profiles for marketing or for elaborating customized commercial advertisements, or data are sold to analysts and advertising agencies.

Despite the fact that tracking services are quite common and play an important role in the web economy, users are almost completely unaware of them and of the fact that someone can make money out of the data that they leave during their on-line activity.

The privacy implications are serious. Consumers and corporates do worry about the information they unknowingly expose to the outside world, and they claim for mechanisms to curb this leakage.

The use of web tracking practice causes leakage of information that users and companies would like to keep private: from sexual or religious preferences, to simple browsing histories. Many surveys have demonstrated that consumers and corporates would like to take control on the information they expose to web trackers. Governments and policymakers have taken steps to intervene and advocated new technical approaches to enhance consumer choice about web tracking.

Hence, there is a large ongoing effort to build technical countermeasures against web tracking. For instance, big players have proposed their own anti-tracking feature. Many plugins have been introduced to block interactions among the browser and tracking services. So far, the research community has focused on disclosing and quantifying the vastness of the problem, but only a few solutions have been proposed to curb this phenomenon.

First countermeasures to web tracking are based on blacklisting of tracking services and contents. As web tracking has raised many concerns about how it may affect users' privacy, many tracker-blocking applications, mostly being browser plugins, are available. They basically filter HTTP requests generated to tracking services. These applications rely on blacklists built offline to prevent the browser to generate HTTP requests to web trackers. However, how these blacklists are generated is impossible to know, and they are difficult to maintain over time.

In a different approach, a plugin for browser exits which analyzes how the cookies are manipulated and from which services. In a nutshell, this approach labels as trackers the owners of the pieces of code handling cookies and Adobe Flash plugins containing user identifiers. Such approach is based on the analysis of the Javascript or Flash code contained in the web pages.

However, simple actions such as blocking cookies are easily bypassed by web tracking services. For instance, a common workaround is to embed user identifiers in URL queries contained in HTTP requests.

Another approach is based on graph analysis techniques: the structure of the web pages is modelled as a graph and machine learning techniques are used to analyze the structure of webpage code and discover portion of code suspected of collecting user information thus identifying web trackers. In this case again, the detection of tracking services is based on the analysis of web pages themselves.

The main disadvantage of these methods is that they require a supervision from an analyst, which studies the web pages and use predefined classification models, which are static and must be changed time by time.

Hence, we need a method for detecting services running some tracking activity. The method must be is easy to use and automatically detect these services without the need of the assistance of an operator, thus generating curated blacklists that may be employed by any browser to block the web tracking services users encounter.

BRIEF SUMMARY OF THE INVENTION

Embodiments of the present invention relate to a method for detecting tracking services which overcomes the disadvantages of the prior art.

In one embodiment, the method of the present invention for detecting web tracking services during browsing activity performed by clients having associated client identifiers comprises the steps of extracting key-value pairs contained into navigation data; looking for (4) one-to-one correspondence between said client identifiers and the values contained in said keys; selecting the keys for which at least a client-value one-to-one correspondence for at least a predetermined number of clients is observed, said keys identifying the associated services as services performing tracking activities.

In another embodiment, the one-to-one correspondence is observed, for each client, across different and progressive uses of the same navigation data.

In another embodiment, the navigation data are HTTP or HTTPS GET requests or data transmitted via POST requests or data embedded in cookies.

In another embodiment, the first-party tracking services are detected.

In another embodiment, third-party tracking services are detected.

In another embodiment, combination of keys whose values exhibit one-to-one correspondence with a client are detected.

In another embodiment, the predetermined number of clients is determined so as neither to misclassify keys that contain other kind of information nor to cut out legit positive keys associated to a large set of third-party objects that may not be always present.

BRIEF DESCRIPTION OF THE DRAWINGS

Other characteristic, objectives and advantages of the invention will become apparent from the following description, which is purely illustrative and non-limiting, and is to be read with reference to the figures, in which.

DETAILED DESCRIPTION OF THE INVENTION

Briefly, the present invention relates to an unsupervised method that leverages application-level traffic logs to automatically detect services running some tracking activity, thus enabling the generation of curated blacklists. The method builds on an algorithm that pinpoints pieces of information containing client identifiers exposed in URL queries in HTTP (or HTTPS) transactions. Hence, its analysis is passive and only requires the availability of HTTP (or HTTPS) transaction logs. In addition to that, the method of the present invention is unsupervised as it does not require to know in advance the set of fields or keys containing client identifiers employed by tracking services. The result of the classification can be used to block the traffic towards tracking services thus preserving the privacy of the users.

The method of the present invention is suitable for detecting both first-party and third-party services. In the following description reference will be made to client identifiers or keys present in URL queries in HTTP transactions but the method of the present invention also applies to HTTPS GET requests or to information or data transmitted via POST requests, or which are embedded in cookies.

The method of the present invention builds on the availability of application-level traffic logs, i.e., traffic traces reporting the information contained in the headers of HTTP transactions. This kind of logs may be automatically generated by browsing bots or crawlers, or shared by users in a crowdsourced system. Considering that tracking services rely on per-user unique identifiers which browsers expose in the URL queries, the method of the present invention analyzes URLs in HTTP request headers and seeks for pieces of information exhibiting a one-to-one mapping with the client profile generating the request. These pieces of information are identifiers contained in cookies, fingerprints, etc.

Figures 1, 2:
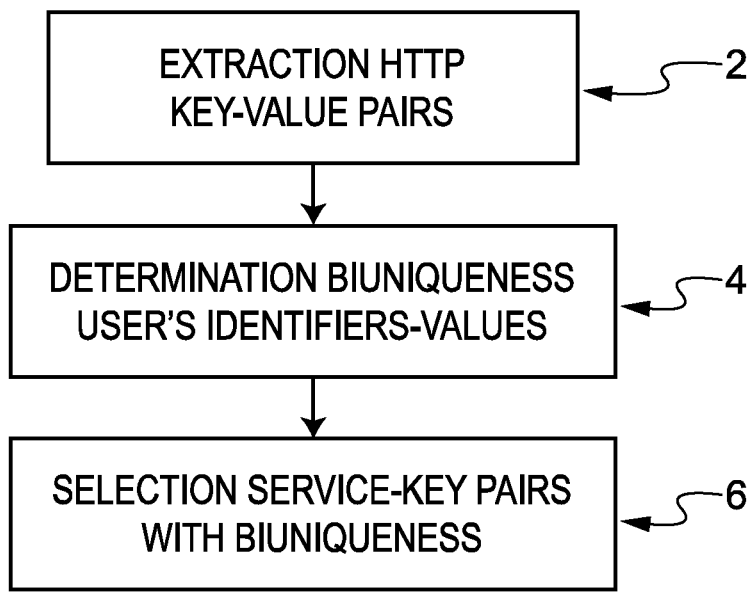
FIG. 1 is a block diagram of the steps of the method for detecting tracking services according to the present invention.
FIG. 2 is an example of keys detected for users in different visits of a website.

FIG. 1 shows a block diagram of the steps of the method for detecting tracking services according to the present invention.

Given a collection of logs HS aggregating HTTP transactions generated by a predetermined set of clients (crawlers or users' browsers) and a targeted website domain W, the method begins at step 2 with the extraction of all HTTP key-value pairs contained in each HTTP request directed or referring to W, i.e., having W in the "Host" field of the communication. W is a first-party service if it is the same W contained in the "Referer" field of the communication or if the "Referer" field is empty; otherwise, W is a third-party service if the W domain in the "Host" field is different the domain present in the "Referer" field.

In the present description when referring to "clients" it is meant a single device (PC, smartphone, tablet, etc.) and not a single user.

Consider for example
http://www.W.com/query?key1=X&key2=Y,
at step 2, key and key2 are extracted with values X and Y, respectively.

Then, at step 4, for each key, the biuniqueness between per se known identifiers of the clients generating the requests (e.g., the browser profile) and the values contained in the keys is investigated. The method looks for any key whose values are uniquely associated to the clients, i.e., i) is different for each different clients but ii) is the same for the same client.

Finally, at step 6 the keys for which it is observed at least a client-value biuniqueness (one-to-one correspondence) for at least a predetermined number of clients (minClient, see below) are selected. Said keys identify services (the associated ones) which perform tracking activities.

FIG. 2 shows an example of keys: key1, key2 and key3. Considering key1, it takes different values for different clients, namely client 1, client 2, ... client$_n$, but these values are not equal across different visits Visit-1, Visit-2 and Visit-3, making key1 a possible session identifier. Key2 maintains the same value across different clients and visits. The key that the method of the present invention elects as client-tracking is key3, as it is the only one whose values are different for different clients, but do not change across different and progressive visits.

As an alternative embodiment, instead of focusing on the client-tracking keys embedded in the URL queries of HTTP GET requests, it is possible to process data that a client transmits to the servers via POST requests, or which are embedded in cookies.

Similarly, instead of focusing on detecting single client-identifying keys, i.e., keys whose values alone show a one-to-one mapping with the client generating the requests, it is possible to detect combinations of keys whose values exhibit biuniqueness with the client. The use of combination of keys is in particular suitable when considering the cookie o POST requests.

In the following part of the description it will be disclosed the impact of parameters choice on the method of the invention. MinClients the minimum number of unique client-value pairs the method must observe to label a key as client identifier. In particular, it is important to check how the number of returned keys which the method classifies varies when increasing minClients.

One possibility is to set minClients large because, if too low, it is expected to misclassify those keys that may instead contain other kind of information, such as, e.g., session identifiers. In other words, a small minClients may increase the number of false positives.

On the other hand, a too large minClients could cut out legit positives associated to portals, which embed a large set of third-party objects that may not be always present. For instance, some users may access a new portal at the moment it embeds a third-party advertisement adi using a given client-identifying key ki, but other client accessing the same portal may encounter a different advertisement service adj and thus a different key kj. In this case the population of client gets split in two halves, and a too large minClients would filter both of them out from the set of true positives.

An experiment has been done to evaluate the trade-off value for minClients, which guarantees a reasonable accuracy while not cutting out legit true positives.

Figure 3:
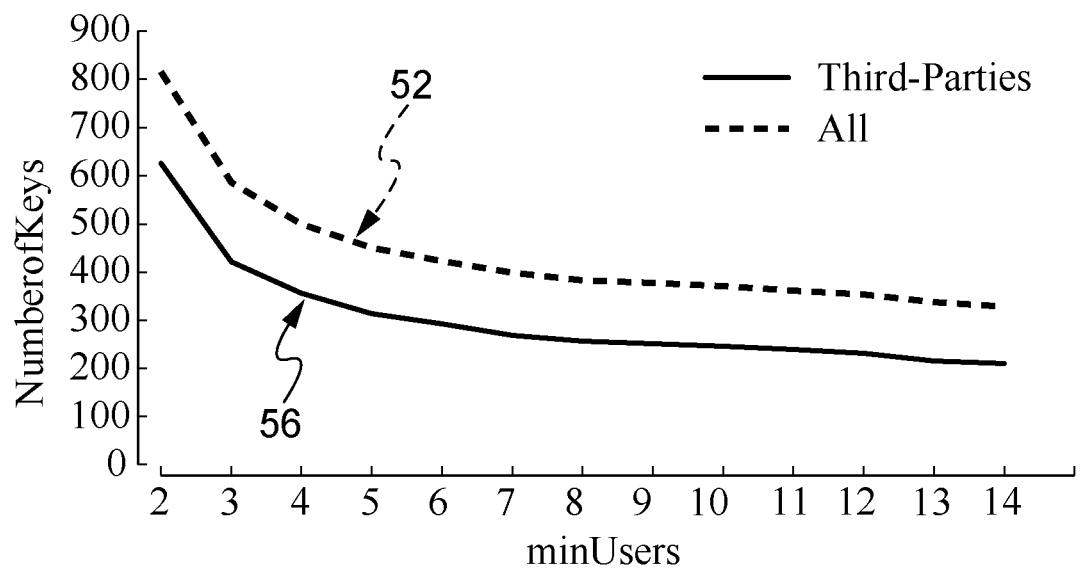
FIG. 3 is a graph showing the number of detected keys as a function of the number of users for which these keys are to be the same.

FIG. 3 reports the number of client-identifying keys the method of the present invention identifies when different minClients values are set to process all the requests HS in a dataset.

It is considered both the cases in which the method processes the set of HTTP requests to third-party services only—services embedded in websites whose HTTP requests show a mismatch between the hostnames contained in Host and Referer fields—(first curve 50), and all the requests (i.e., taking into account both first- and third-parties) in the dataset (second curve 52). As expected, the number of keys increases when minClients is small.

It can be observed that the number of keys keeps decreasing when minClients increases. For third-parties the number of keys labelled as client-tracking decreases to 210 when minClients equals 14, and to 328 when considering both first- and third-parties.

It has been observed that the pool of third-party web services associated to the same website actually changes between different visits. Hence, as a counterproof, a second experiment has been run: first, a set of services for which visits have been done by each of a predetermined number of client, for example 14, has been selected. Given the resulting subset of services, the initial HS collection has been filtered to keep only the requests pointing to these services, thus obtaining a smaller dataset HSclients_small. Then, the dataset HS clients_small has been used perform again steps 2 to 6 by varying minClients.

It has been observed that the number of keys stabilizes at 328 when minClients≥6, while some false positives (keys associated to services in HSclients_small but carrying session identifiers mostly) are found for values of minClients<6. The impact is minimal but present.

Setting minClients=6 the method can correctly label a key as client-identifying, while on the other hand too dynamic web services actually implementing some user-tracking feature are not filtered out.

The result presented in FIG. 3 shows that both first- and third-parties do employ keys to track clients, and thus the users behind them. Indeed, when minClients equals 6 it has been observe that more than 130 keys are employed by 121 different first-party services, and more than 300 client-identifying keys are associated to third-party services.

The method has been performed over a whole artificial dataset and a list containing more than 100 third-party services using some client-identifying key has been found. It has been found that the top 10 third-party trackers appear to be associated to 20 or more first-parties (out of 200 that has been considered for the analysis), and most of the third-party trackers cover a very limited number of first-party services. More than 40 trackers cover one service only.

In the following, some interesting findings that emerge when analyzing the clients-identifying keys returned by the present method and the values they contain, are presented.

More in detail, it has been observed that in many cases the same value, i.e., the unique piece of information associated to a client, is contained in clients-identifying keys used by different services.

Figure 4:
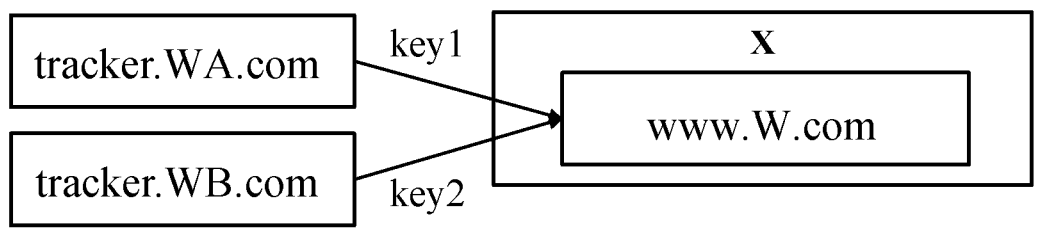
FIG. 4 is a block diagram of a first example of interactions among user-identifying keys used by different services.

To represent these interactions, the schema in FIG. 4 has been employed: www.W.com is the visited website; tracker.WA.com and tracker.WB.com are both services labelled as trackers by the present method; key1 and key2 are the tracking keys they respectively employ to identify clients; X is a client identifier key value (for example, a hash contained in a cookie) picked from the dataset and contained in both key1 and key2. Surprisingly, both key1=x and key2=x, despite key1 and key2 are independently generated by WA and WB. Clearly, this pinpoints to some collision between the two.

Three main scenarios in which client identifiers are shared across several services have been observed.

Figure 5:
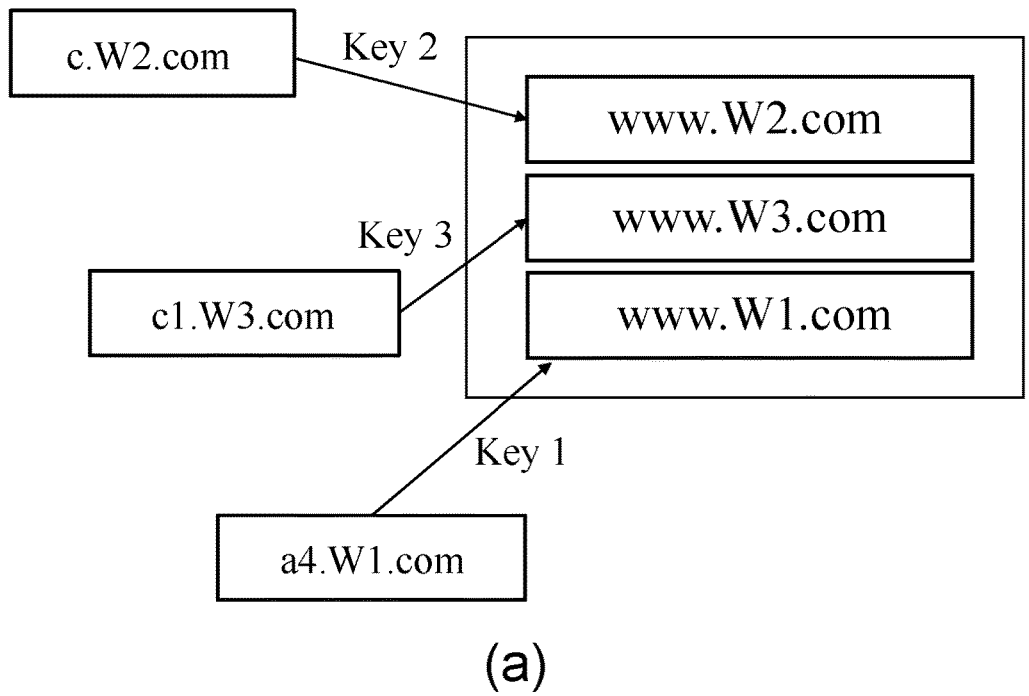
FIG. 5 is a block diagram of a further example of interactions among user-identifying keys.
Figure 5:
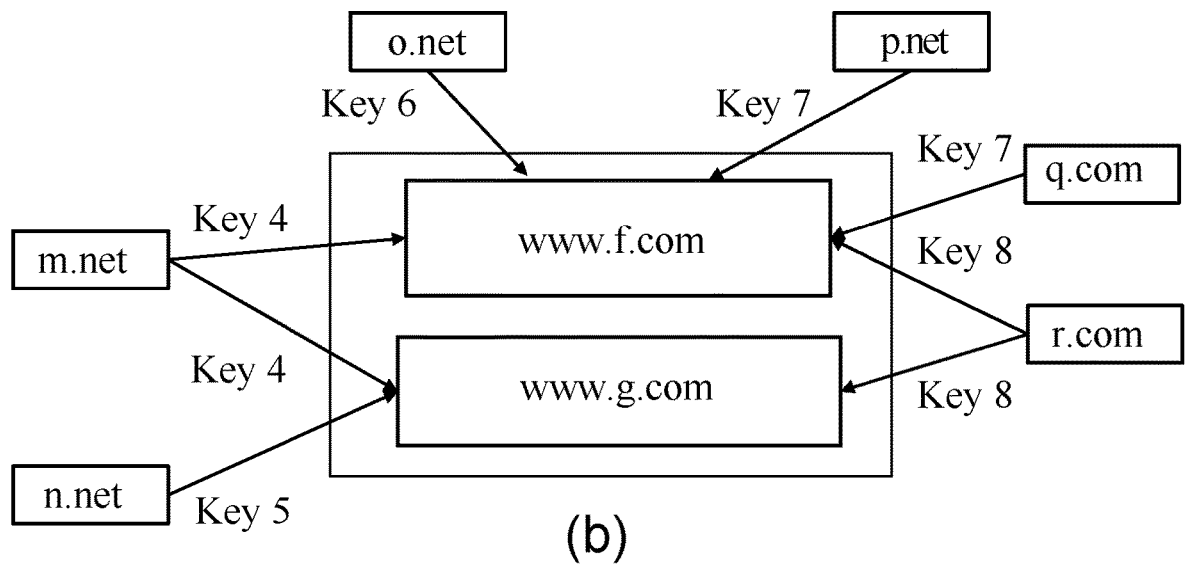

The simplest scenario is similar to the example depicted in FIG. 5(a). In this case, a user accessing the first-party services www.W1.com, www.W2.com and www.W3.com administrated by a same corporate Z is tracked by the services c1.W3.com, a4.W1.com, and c.W2.com (still administrated by Z) which use different keys, key 1, key 2 and key 3, respectively, to exchange the same client identifier value. Being the client identifier shared among services under the same corporate umbrella Z, this suggests a tracking platform administrated by the same organization. This case does not appear controversial from a privacy perspective.

A second interaction example is very similar to schema example in FIG. 4 and is not figured for brevity. In this case, a client accessing a first-party service www.Y.com is assigned an identifier employed by the third-party services s and t, and contained in a key t1.

There are two substantial differences with respect to the scenario depicted in FIG. 5(a): first, the same client identifier is shared among two different third-party services s and t not belonging to the same owner. Second, third-party service s employs a key provided by t, which may be a well-known tracking company. This kind of interaction is the typical result of a practice that allows two separate parties to synchronize their users' identifiers (Cookie Matching).

For example, typically, a client is assigned cookies from the several parties she encounters during her browsing activity. Hence, two trackers normally assign their own distinct cookies to the same client. Thanks to the Cookie Matching mechanism, one or both of them will have these cookies mapped to each other. Cookie matching constitutes a fundamental part of the Real-Time Bidding (RTB) mechanism, which is a common web advertising technique which implements real-time automatic auctions.

Typically, a website enabling RTB, called seller in RTB terminology, aims at selling the advertisement spaces available on its page for the best offer. To enable the auction, two other kinds of third-parties are involved: the auctioneer, that orchestrate the auction, and the buyers, which generate bids for the advertisement spaces. When a user visits the seller website, the auctioneer service collects the identifiers contained in cookies from different buyers and run the Cookie Matching practice. Once the client identifier is synchronized among the auction participants, the auctioneer collects the buyers' bids and elects the winning buyer. Hence, this latter will be authorized to provide the content to fill the advertisement space.

The last example of interaction is depicted in FIG. 5(b). This scenario hints to a practice which combines Cookie Matching and RTB. It has been observed that the same client identifier (m.net and r.com 8) is shared between two sellers, www.f.com and www.g.com (which are governed by the same owner), an auctioneer, and five different buyers. Although RTB and Cookie Matching are acclaimed by the advertising industry, their implementation leads to scenarios in which client identifiers are handled by different players not governed by a common authority. It is believed that this cross-parties access to users' data looks boggling and raises considerable worries about their implications on users' privacy.

Summarizing, the present invention relates to a novel, unsupervised method which inspects URL queries in HTTP requests and seeks for the pieces of information exhibiting a one-to-one mapping with the client generating the requests. The method outputs a list of first- and third-party web services which employ any client-tracking keys.

The method is effective at automatically scouting tracking services, it is simple and can be employed by researchers, developers and practitioners to pinpoint tracking services in the web. Moreover, as it seeks for the user identifiers employed by web trackers, it is suitable for other contexts.

The written description uses examples to disclose the various embodiments, including the best mode, and also to enable any person skilled in the art to practice the embodiments, including making and using any devices or system and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements within insubstantial differences from the literal languages of the claims.

The invention claimed is:

1. A method for detecting web tracking services during browsing activities performed by a plurality of clients associated with a plurality of client identifiers, the method comprising the steps of:
for each of said plurality of clients, extracting key-value pairs contained in navigation data, said key-value pairs being directed or referred to a targeted website domain, each of said key-value pairs containing a corresponding key and a corresponding value;
analyzing key-value pairs associated with said plurality of clients to determine whether values associated to a particular key contained in said key-value pairs exhibit one-to-one correspondence with said client identifiers;
in response to determining that said key-value pairs containing said particular key whose values are one-to-one correspondence with said client identifiers, selecting said particular key;
identifying a service that is associated with said particular key as a service performing tracking activities; and
adding said service performing tracking activities to a curated blacklist used for blocking at least a portion of network traffic toward said service performing tracking activities.

2. The method according to claim 1, wherein said one-to-one correspondence is observed, for each of the clients, across different and progressive uses of the same navigation data.

3. The method according to claim 1, wherein said navigation data are HTTP or HTTPS GET requests or data transmitted via POST requests or data embedded in cookies.

4. The method according to claim 1, wherein first-party tracking services are detected.

5. The method according to claim 1, wherein third-party tracking services are detected.

6. The method according to claim 1, wherein combinations of said key-value pairs whose values exhibit one-to-one correspondence with a client are detected.

7. The method according to claim 1, wherein said predetermined number of clients is determined so as neither to misclassify keys that contain other kind of information nor to cut out legit positive keys associated to a large set of third-party objects that may not be always present.

8. The method according to claim 2, wherein said navigation data are HTTP or HTTPS GET requests or data transmitted via POST requests or data embedded in cookies.

9. The method according to claim 2, wherein first-party tracking services are detected.

10. The method according to claim 2, wherein third-party tracking services are detected.

11. The method according to claim 2, wherein combinations of said key-value pairs whose values exhibit one-to-one correspondence with a client are detected.

12. The method according to claim 2, wherein said predetermined number of clients is determined so as neither to misclassify keys that contain other kind of information nor to cut out legit positive keys associated to a large set of third-party objects that may not be always present.

13. A method for detecting web tracking services during browsing activities performed by clients, the method comprising the steps of:
extracting key-value pairs contained in navigation data associated with a plurality of clients, said navigation data being directed to or referring to a targeted domain, each of said key-value pairs containing a corresponding key and a corresponding value;
analyzing key-value pairs associated with a plurality of different visits by said plurality of clients to determine whether values associated to a particular key contained in said key-value pairs exhibit one-to-one correspondence with said clients, such that different clients correspond to different values while a given client corresponds to a same value across different visits by said same given client;
in response to determining that said key-value pairs containing said particular key whose values are one-to-one correspondence with said clients, selecting said particular key;
identifying a service that has used said particular key to perform tracking activities; and
adding said service performing tracking activities to a curated blacklist used for blocking at least a portion of network traffic toward said service performing tracking activities.

14. The method according to claim 13, wherein said one-to-one correspondence is observed, for each of the clients, across different uses of the same navigation data.

15. The method according to claim 13, wherein said navigation data is contained in one or more HTTP requests, one or more HTTPS GET requests, data transmitted via one or more POST request, or data embedded in one or more cookies.

16. The method according to claim 13, wherein the targeted domain and service performing tracking activities are the same entity, such that first-party tracking services are detected.

17. The method according to claim 13, wherein the targeted domain and service performing tracking activities are different entities, such that third-party tracking services are detected.

18. The method according to claim 13, wherein combinations of said key-value pairs whose values exhibit one-to-one correspondence with a client are detected.

19. The method according to claim 13, wherein said predetermined number of clients is determined based on risk of misclassifying keys that contain other kind of information compared to risk of cutting out legit positive keys associated to a large set of third-party objects that may not be always present.

\* \* \* \* \*